(12) United States Patent
Michihata et al.

(10) Patent No.: US 11,470,922 B2
(45) Date of Patent: Oct. 18, 2022

(54) MOLDED SURFACE FASTENER AND METHOD FOR MANUFACTURING SAME

(71) Applicant: YKK Corporation, Tokyo (JP)

(72) Inventors: Isamu Michihata, Toyama (JP); Yui Hashimoto, Toyama (JP)

(73) Assignee: YKK Corporation, Tokyo (JP)

( * ) Notice: Subject to any disclaimer, the term of this patent is extended or adjusted under 35 U.S.C. 154(b) by 1041 days.

(21) Appl. No.: 16/081,412

(22) PCT Filed: Apr. 1, 2016

(86) PCT No.: PCT/JP2016/060967
§ 371 (c)(1),
(2) Date: Aug. 30, 2018

(87) PCT Pub. No.: WO2017/168757
PCT Pub. Date: Oct. 5, 2017

(65) Prior Publication Data
US 2020/0390199 A1 Dec. 17, 2020

(51) Int. Cl.
*A44B 18/00* (2006.01)
*B29C 43/22* (2006.01)
(Continued)

(52) U.S. Cl.
CPC ...... *A44B 18/0049* (2013.01); *A44B 18/0065* (2013.01); *B29C 43/222* (2013.01);
(Continued)

(58) Field of Classification Search
CPC .............. B29C 2043/461; B29C 43/46; A44B 18/0049
See application file for complete search history.

(56) References Cited

U.S. PATENT DOCUMENTS 4,894,060 A 1/1990 Nestegard
4,984,339 A 1/1991 Provost et al.
(Continued)

FOREIGN PATENT DOCUMENTS

JP S58-500192 A 2/1983
JP H02-005947 A 1/1990
(Continued)

OTHER PUBLICATIONS

International Search Report, PCT Patent Application No. PCT/JP2016/060967, dated Jun. 21, 2016.
(Continued)

*Primary Examiner* — Robert Sandy
*Assistant Examiner* — Michael S Lee
(74) *Attorney, Agent, or Firm* — Kilpatrick Townsend & Stockton LLP (57) ABSTRACT

Provided is a molded surface fastener having an improved balance between durability against repeated attachment and detachment operations and peeling strength. A molded surface fastener made of a thermoplastic resin, includes: a flat plate-shaped base portion; and a plurality of engaging elements protruding from one main surface of the base portion. Each engaging element includes: a stem upstanding from the main surface; and an engaging head portion formed at an upper end portion of the stem, the head portion including a projection portion extending mainly in a direction perpendicular to a molding direction as viewed in a planar view.

12 Claims, 4 Drawing Sheets

(51) Int. Cl.
*B29C 43/46* (2006.01)
*B29L 31/00* (2006.01)

(52) U.S. Cl.
CPC ........ *B29C 43/46* (2013.01); *B29C 2043/461* (2013.01); *B29L 2031/729* (2013.01)

(56) References Cited

U.S. PATENT DOCUMENTS

| | | | |
|---|---|---|---|
| 5,077,870 A | 1/1992 | Melbye et al. | |
| 5,537,723 A | 7/1996 | Yoshida et al. | |
| 5,679,302 A | 10/1997 | Miller et al. | |
| 5,845,375 A * | 12/1998 | Miller | A44B 18/0073 24/452 |
| 6,039,911 A | 3/2000 | Miller et al. | |
| 6,368,097 B1 | 4/2002 | Miller et al. | |
| 6,627,133 B1 | 9/2003 | Tuma | |
| 2003/0080453 A1 | 5/2003 | Bay et al. | |
| 2003/0124303 A1 | 7/2003 | Price et al. | |
| 2003/0145440 A1 | 8/2003 | Ausen et al. | |
| 2006/0096071 A1 | 5/2006 | Pacione et al. | |
| 2013/0149488 A1 * | 6/2013 | Chandrasekaran | B29C 65/08 264/210.1 |
| 2014/0350507 A1 | 11/2014 | Pariseau et al. | |
| 2015/0313320 A1 * | 11/2015 | Mahe | B29C 43/222 264/331.11 |
| 2020/0352287 A1 * | 11/2020 | Gorman | B65D 33/24 |
| 2020/0385175 A1 * | 12/2020 | Gorman | B65D 33/243 |
| 2021/0000226 A1 * | 1/2021 | Gorman | B65D 33/2508 |
| 2021/0000227 A1 * | 1/2021 | Gorman | B65D 33/2558 |
| 2022/0110461 A1 * | 4/2022 | Cosgrove | A47G 1/1613 |
| 2022/0175094 A1 * | 6/2022 | Arthur | A61M 25/02 |

FOREIGN PATENT DOCUMENTS

| | | |
|---|---|---|
| JP | H06-500486 A | 1/1994 |
| JP | H08-508910 A | 9/1996 |
| JP | 2002-519078 A | 7/2002 |
| JP | 2002-534194 A | 10/2002 |
| JP | 2005-508678 A | 4/2005 |
| JP | 2005-511123 A | 4/2005 |
| JP | 2005-514976 A | 5/2005 |
| JP | 2005-520577 A | 7/2005 |
| JP | 4134337 B | 8/2008 |
| JP | 4699349 B2 | 6/2011 |
| JP | 2014-526341 A | 10/2014 |
| WO | 82/02480 A1 | 8/1982 |
| WO | 00/41479 A1 | 7/2000 |
| WO | 03/028499 A1 | 4/2003 |

OTHER PUBLICATIONS

International Preliminary Report on Patentability, PCT Patent Application No. PCT/JP2016/060967, dated Oct. 11, 2018.

* cited by examiner

Molding Direction

MOLDED SURFACE FASTENER AND METHOD FOR MANUFACTURING SAME

TECHNICAL FIELD

The present invention relates to a molded surface fastener. The present invention also relates to a method for manufacturing the molded surface fastener.

BACKGROUND ART

A surface fastener is a fastener of a type in which a pair of tapes are joined together by pressing them to each other. One of the tapes is usually a loop pile fabric, and the other tape has a number of engaging elements fixed to the surface, which engaging elements are formed to engage with the loops. Recently, the surface fasteners have been used as fastening tools for disposable diapers, simple medical clothing, napkins, various simple working clothing, underwear, and the like. In particular, integrally molded type surface fasteners having a number of small-scale engaging elements on the plate-shaped substrate have been widely employed.

The form of the engaging elements of the integrally molded type surface fastener is roughly classified into a hook type and a mushroom type, as widely known in the art. The hook type has a shape in which a head portion of each engaging element protrudes in a non-uniform direction and has directional engagement. On the other hand, the mushroom type has a shape in which a head portion of each engaging element protrudes in a uniform direction and has no directional engagement.

The mushroom type surface fastener is generally manufactured by coining a heat-deformable stems upstanding from a base member to form hook portions of a surface fastening system. For example, Japanese Patent No. 4699349 B discloses a process for molding shaped heads on tips of stems, the process comprising: first injection-molding a hook plate with an upstanding array of stems; and then applying heat and pressure to the tips of the stems by means of a heated coining surface to cause softening of a portion of the tips of the stems and the formation of shaped heads at the tips of the stems.

However, the mushroom type engaging elements and the piles are engaged in a so-called hanging state where the loops twining around the neck portions engages with the head portions of the engaging elements. Therefore, when the loops are detached from the head portions, it is highly likely that the engaging elements are cut at the necks or the loops themselves are cut, they are often not able to withstand repeated use, and at the same time the peeling strength tends to be excessively high. On the other hand, the hook-type engaging elements are characterized in that they are easily engaged with the loops as compared with the mushroom-type engaging elements, more appropriate peeling strength can be easily obtained, and further there is no cutting of the engaging elements and the loops upon peeling, so that they can withstand repeated use.

Conventionally, the hook-type surface fastener is manufactured by supplying a molten resin onto a circumferential surface of a cylindrical drum having a large number of substantially J- or Y-shaped cavities which extend in a curved manner from the inside of the drum and are opened to the circumferential surface, to form a plate-like substrate along the circumferential surface, while at the same time filling the cavities with a part of the molten resin to integrally form J-shaped or Y-shaped hooks on the back side of the substrate; and, after cooling, peeling off the molded article from the circumferential surface of the drum (U.S. Pat. Nos. 4,984,339; 5,537,723). However, with such a manufacturing method, a large bending stress will be applied to the hooks when peeling off the hooks from the drum and the hooks will tend to generate cracks and breakage, so that the shape of the hooks that can be manufactured is limited.

Accordingly, in recent years, a combined method of the hook-type manufacturing method and the mushroom-type manufacturing method has been proposed. The method is used to obtain a primary molded article made of a thermoplastic resin, which has a large number of upstanding stems on a surface of a flat substrate, and then the tips of the stems of the molded article are heated and softened to form head portions. Japanese Patent Application Publication No. 2002-519078 A discloses a method of molding head portions by simple mechanical reshaping which deforms stems by means of a calender without melting. Japanese Patent No. 4134337 B discloses that a melting front and a compression front of a stem are adjusted by means of a heating roll. Japanese Patent Application Publication No. S58-500192 A discloses a method of causing softening of terminal ends without causing melting of stems by pressing a tape against a heated surface portion, thereby deforming the terminal ends. It also disclosed that a non-softened portion is elastically deformed. Japanese Patent Application Publication No. 2002-534194 A discloses that terminal ends of stems are heated to a softening temperature, while maintaining the sheet-form base and a lower portion of each stem at a temperature lower than the softening temperature, and the terminal ends of the stems are contacted with a contact surface that is at a predetermined molding temperature lower than the softening temperature, to deform the terminal ends.

CITATION LIST

Patent Literatures

Patent Document 1: Japanese Patent No. 4699349 B
Patent Document 2: U.S. Pat. No. 4,984,339
Patent Document 3: U.S. Pat. No. 5,537,723
Patent Document 4: Japanese Patent Application Publication No. 2002-519078 A
Patent Document 5: Japanese Patent No. 4134337 B
Patent Document 6: Japanese Patent Application Publication No. S58-500192 A
Patent Document 7: Japanese Patent Application Publication No. 2002-534194 A

SUMMARY OF INVENTION

Technical Problem

Although it is useful to mold the surface fastener separately in two stages of primary molding of stems and molding of head portions, the heating of the stems at a temperature lower than the melting point to undergo plastic deformation will leave a strain in the head portions. The residual stain causes a problem that the head portions tend to be broken when the surface fastener is repeatedly detached and attached. On the other hand, the problem of the residual strain is solved when the head portions are formed by melting and deforming the stems. However, there is a problem that peeling strength of the surface fastener is decreased.

The present invention has been made in view of the above circumstances. An object of the present invention is to provide a molded surface fastener having an improved balance between durability against repeated attachment and detachment operations and peeling strength. Also, another object of the present invention is to provide a method for manufacturing the molded surface fastener.

Solution to Problem

As a result of extensive studies to solve the above problems, the present inventors have found that controlling the balance of retardation in the stems and the head portions while controlling the retardation in the head portions to a predetermined range is effective to solve the above problems. The present invention has been completed based on the above findings.

In one aspect, the present invention relates to:
a molded surface fastener (100) made of a thermoplastic resin, comprising: a flat plate-shaped base portion (102); and a plurality of engaging elements (101) protruding from one main surface of the base portion (102),
wherein each engaging element (101) comprises: a stem (103) upstanding from the main surface; and an engaging head portion (104) formed at an upper end portion of the stem (103), the head portion (104) comprising a projection portion (105) extending mainly in a direction perpendicular to a molding direction as viewed in a planar view; and
wherein the molded surface fastener (100) satisfies the relationships: $2 \leq R2_{avg} \leq 100$, and $R2_{avg}/R1_{avg}=0.04$ to 5.0, in which $R1_{avg}$ (unit: nm) is an average value for retardation at a position which is a half of a height of each engaging element (101) from the main surface of the base portion (102), and $R2_{avg}$ (unit: nm) is an average value for retardation of each engaging head portion (104) on two lines extending vertically upward from two boundary points on the right and left between the stem (103) and the projection portion (105), in a cross section taken when each engaging element (101) is cut at a center of the molding direction in the direction perpendicular to the molding direction.

In one embodiment of the molded surface fastener, the molded surface fastener satisfies the relationship: $5 \leq R2_{max} \leq 200$, in which $R2_{max}$ (unit: nm) is the maximum value for retardation of the engaging head portion (104) on the two lines extending vertically upward from two boundary points between the stem (103) and the projection portion (105), respectively.

In another embodiment of the molded surface fastener according to the present invention, the $R1_{avg}$ is from 20 to 40 nm.

In yet another embodiment of the molded surface fastener according to the present invention, the $R2_{avg}$ is from 20 to 50 nm.

In still another embodiment of the molded surface fastener according to the present invention, the thermoplastic resin has a melting point of from 150 to 170° C.

In yet another embodiment of the molded surface fastener according to the present invention, the thermoplastic resin is polypropylene.

In another aspect, the present invention relates to:
a method for manufacturing a molded surface fastener, comprising the steps of:
1) providing a long strip primary molded article made of a thermoplastic resin, the primary molded article comprising a plurality of upstanding stems having residual strain on one main surface;

2) while conveying the primary molded article in a longitudinal direction, melting and deforming an upper end portion of each stem to preform an engaging head portion comprising a projection portion extending mainly in a direction perpendicular to a conveying direction as viewed in a planar view, by pressing the primary molded article at a pressure of from 3 to 300 kPa for 1 second or less with a first press portion, the first press portion having a temperature higher than the melting point of the resin by 0 to 70° C. on the upper end portion side of the stem and a temperature of from 10 to 50° C. on the other main surface side of the primary molded article;

3), after the step 2), while conveying the preformed primary molded article in the longitudinal direction, melting and deforming the engaging head portion to adjust a shape and retardation of the engaging head portion by pressing the preformed primary molded article at a pressure lower than the pressure in the step 2) but from 3 to 150 kPa for 0.3 to 10 seconds with a second press portion, the second press portion having a temperature higher than the melting point of the resin by 0 to 70° C. on the engaging head portion side of the preformed primary molded article and a temperature of from 10 to 50° C. on the other main surface side of the preformed primary molded article; and 4), after the step 3), while conveying the primary molded article with the adjusted shape and retardation of the engaging head portion in the longitudinal direction, cooling the engaging head portion and the other main surface by bringing each of them into contact with a cooling zone to provide a secondary molded article.

In one embodiment of the method for manufacturing the molded surface fastener according to the present invention, the step 2), the step 3) and the step 4) are carried out while the primary molded article obtained by the step 1) passes between a first endless belt conveyor comprising a first endless belt running in contact with the upper end portions of the stems of the primary molded article and a pair of guide rollers for guiding a running route of the first endless belt, the guide rollers being positioned in front and rear in the conveying direction; and a second endless belt conveyor comprising a second endless belt running in contact with the other main surface of the primary molded article and a pair of guide rollers for guiding a running route of the second endless belt, the guide rollers being positioned in front and rear in the conveying direction.

In another embodiment of the method for manufacturing the molded surface fastener according to the present invention, the step 2) is carried out by pressing the primary molded article with the two guide rollers positioned at the front part.

In still another embodiment of the method for manufacturing the molded surface fastener according to the present invention, the step 3) is carried out by pressing the engaging head portions of the primary molded article in contact with the first endless belt from the first endless belt side with a heating member having a temperature higher than the melting point of the resin by 0 to 70° C., and by pressing the other main surface of the primary molded article in contact with the second endless belt from the second endless belt side with a cooling member having a temperature of from 10 to 50° C.

In still another embodiment of the method for manufacturing the molded surface fastener according to the present invention, the step 4) is carried out by pressing the engaging head portions of the primary molded article in contact with the first endless belt from the first endless belt side with a cooling member having a temperature of from 10 to 100° C.

but lower than the melting point of the resin, and by pressing the other main surface of the primary molded article in contact with the second endless belt from the second endless belt side with a cooling member having a temperature of from 10 to 50° C.

In yet another aspect, the present invention relates to an article comprising the molded surface fastener according to the present invention.

Advantageous Effects of Invention

According to the present invention, it is possible to provide a molded surface fastener of a type with improved balance between durability against repeated attachment and detachment operations and peeling strength.

DESCRIPTION OF EMBODIMENTS

Hereinafter, various embodiments of the molded surface fastener according to the present invention will be described in detail with reference to the drawings.

(1. Material)

The molded surface fastener according to the present invention can be manufactured by integrally molding a thermoplastic resin as a material. The thermoplastic resin includes, but not particularly limited to, a polyamide resin, a polyester resin, a polypropylene resin, a PVC resin, an ABS resin, a polyethylene resin, and the like. Among them, the polypropylene resin having good fluidity in a molten state is more preferable.

(2. Engagement Element)

Figure 1:
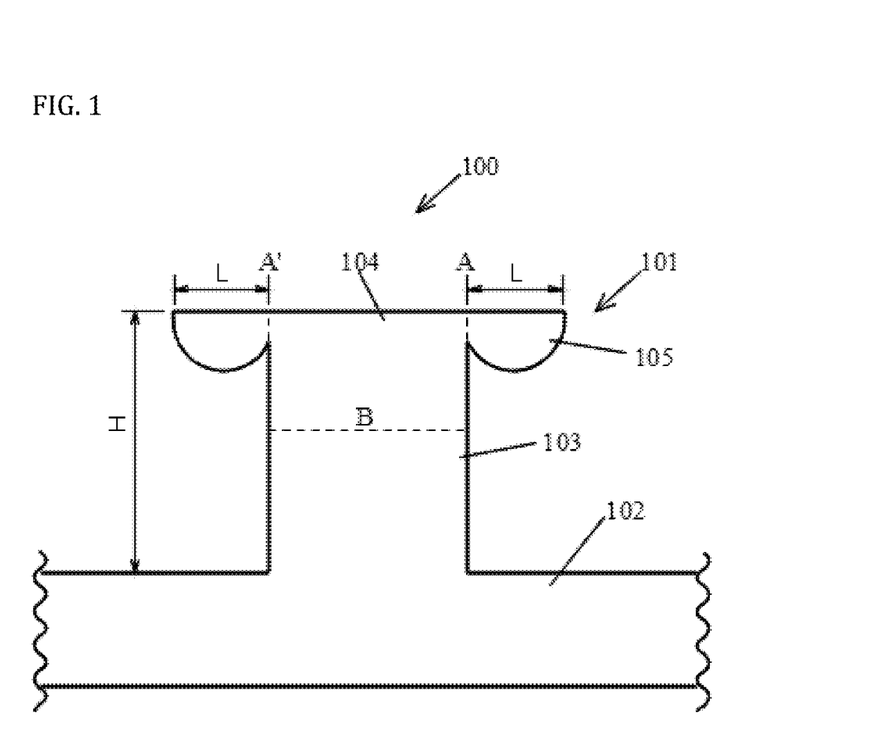
FIG. 1 is a cross-sectional view of an engaging element of a molded surface fastener according to one embodiment of the present invention when cut at a center of a molding direction in a direction perpendicular to the molding direction.

FIG. 1 schematically shows a cross-sectional shape of an engaging element (101) of a molded surface fastener (100) according to one embodiment of the present invention when cut at a center of a molding direction in a direction perpendicular to the molding direction. For the sake of simplicity, FIG. 1 shows single engaging element (101), but the molded surface fastener (100) according to the present embodiment includes a flat plate-shaped base portion (102) and a plurality of engaging elements (101) protruding from one main surface of the base portion (102). The number of the engaging elements (101) per unit area of the main surface of the base portion (102) may be appropriately set depending on required peeling strength, and may be, for example, from 100 to 600/cm$^2$, and typically from 200 to 400/cm$^2$.

Each engaging element (101) includes a stem (103) upstanding from the main surface of the base portion (102) and an engaging head portion (104) formed at the upper end of the stem (103). The engaging head portion (104) includes a projection portion (105) extending mainly in a direction perpendicular to the molding direction as viewed in a planar view. The projection portion (105) can be engaged with an opposing loop of the surface fastener. The engagement of a large number of engaging elements (101) with a large number of loops enhances the connection of a pair of surface fasteners.

The thickness of each stem (103) may be appropriately set according to required peeling strength. However, if the thickness is too thin, durability against repeated attachment and detachment operations will be insufficient. Therefore, the thickness may be preferably 0.005 mm$^2$ or more, and more preferably 0.01 mm$^2$ or more, and still more preferably 0.02 mm$^2$ or more, as expressed by a cross-sectional area. Further, if the thickness of each stem (103) is too thick, it will be difficult to obtain desired peeling strength because a number density of the engaging elements (101) will be insufficient. Therefore, the thickness of each stem (103) may be preferably 0.10 mm$^2$ or less, and more preferably 0.07 mm$^2$ or less, and still more preferably 0.04 mm$^2$ or less, as expressed by a cross-sectional area. The cross-sectional shape of the stem is not particularly limited, and it may be a polygon (triangle, quadrangle, hexagon, or the like), or a circle (true circle, ellipse, oval, or the like), etc. The true circle is preferable because it provides improved uniformity of the primary molded article.

When a height (H) from the main surface of the base portion (102) of the engaging element (101) is too low, the loop will become difficult to engage with the projection portion (105) of the engaging head portion (104). Therefore, the height (H) may be preferably 0.05 mm or more, and more preferably 0.10 mm or more, and still more preferably 0.20 mm or more. Further, when the height (H) from the main surface of the base portion (102) of the engaging element (101) is too high, breakage will tend to occur. Thus, the height (H) may be preferably 1.50 mm or less, and more preferably 0.50 mm or less, and still more preferably 0.30 mm or less.

Figure 2:
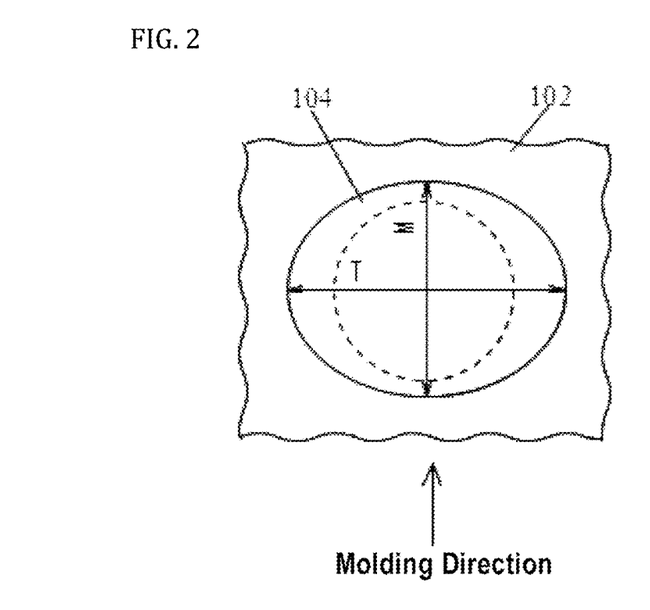
FIG. 2 is a schematic view of an engaging element of a molded surface fastener according to one embodiment of the present invention as observed from an upper side.

In the molded surface fastener according to one embodiment of the present invention, the engaging head portions (104) of the engaging elements can be molded by heat-pressing a long strip primary molded article made of a thermoplastic resin in which a plurality of stems upstand on the flat plate surface, while continuously conveying the primary molded article, as described below. The molding direction is a direction of conveying the long strip primary molded article. As shown in FIG. 2, the engaging head portion (104) of each engaging element (101) can have a shape extending in a direction perpendicular to the molding direction as viewed in a planar view. That is, when the engaging head portion (104) of the engaging element (101) is observed from the upper side, it is preferable that the projection portion (105) somewhat protrudes in a direction perpendicular to the molding direction (in TD direction) than in a direction parallel to the molding direction (in MD direction), as viewed in a planar view. Further, the upper surface of the engaging head portion (104) is preferably flat (a difference in height between the highest point and the lowest point on the upper surface is within 0.05 mm, preferably within 0.02 mm) in order to ensure peeling strength. This is because in the form where the upper surface of the engaging head portion (104) is inclined downward or upward from the center toward the outside, the protruding amount of the projection portion (105) will be decreased so that it will be difficult to engage with the loop.

Since the projection portion (105) has directionality, the engagement with the loop create directionality and moderate peeling strength is obtained, and a retention rate of the peeling strength after repeated attachment and detachment operations can also be increased. In the molded surface fastener (100) according to one embodiment of the present invention, a ratio T:M can be in a range of from 1.0:1.0 to 1.3:1.0, typically a ratio T:M can be in a range of from 1.1:1.0 to 1.2:1.0, in which T is a length of the head portion (104) in a direction perpendicular to the molding direction (in TD direction), and M is a length of the head portion (104) in a direction parallel to the molding direction (in MD direction), when the engaging head portion (104) of the engaging element (101) is observed from above (as viewed in a planar view) (see FIG. 2). T refers to the maximum length of the lengths of the head portion (104) in the direction perpendicular to the molding direction when observing a single engaging element (101), and M refers to the maximum length of the lengths of the head portion (104) in the direction parallel to the molding direction when observing a single engaging element (101).

Further, to provide easy engagement with the loop, the protruding length L of the projection portion (105) from the stem (103) in the direction perpendicular to the molding direction (TD direction) is preferably 0.001 mm or more, and more preferably 0.003 mm or more, and still more preferably 0.005 mm or more, in at least one direction, preferably both directions, of the right and the left directions relative to the molding direction, when the head portion (104) of the engaging element (101) is observed from above (as viewed in a planar view) (see FIG. 2). However, if the protruding length L is too long, damage will tend to occur by repeated attachment to and detachment from the loop. Therefore, the protruding length L is preferably 0.015 mm or less, and more preferably 0.012 mm or less, and still more preferably 0.010 mm or less, in at least one direction, preferably both directions, of the right and the left directions relative to the molding direction.

The retardation is a parameter that is an index of residual strain. In the molded surface fastener (100) according to one embodiment of the present invention, the relationship: $2 \leq R2_{avg} \leq 100$ is satisfied, in which $R2_{avg}$ (unit: nm) is an average value for retardation of the head portion (104) on two lines (dotted lines A and A' in FIG. 1) extending vertically upward from the two boundary points on the right and left between the stem (103) and the projection portion (105), in the cross section when the engaging element (101) is cut at the center of the molding direction in the direction perpendicular to the molding direction. In the molded surface fastener (100) according to one embodiment of the present invention, the relationship: $5 \leq R2_{max} \leq 200$ is satisfied, in which $R2_{max}$ (unit: nm) is the maximum value for the retardation of the head portion (104) on the two lines extending vertically upward from the two boundary points on the right and left between the stem (103) and the projection portion (105). $R2_{avg}$ of 2 nm or more and preferably in combination with $R2_{max}$ of 5 nm or more can provide practical peeling strength. If $R2_{avg}$ is too low, the shape of the projection portion (105) will tend to be rounded during heating pressing, so that it will be difficult to ensure the shape of the projection portion (105) for obtaining appropriate peeling strength. The reason why the inventors focused on the retardation of the head portion (104) on the two lines extending vertically upward from the two boundary points between the stem (103) and the projection portion (105) is that repeated attachment and detachment of the surface fastener will tend to generate cracks around the lines.

$R2_{avg}$ may be preferably 4 nm or more, and more preferably 5 nm or more, and still more preferably 10 nm or more. $R2_{max}$ may be preferably 10 nm or more, and more preferably 15 nm or more, and still more preferably 20 nm or more. Further, $R2_{avg}$ of 100 nm or less and preferably in combination with $R2_{max}$ of 200 nm or less provide resistance to breakage of the head portion (104) even if attachment and detachment of the fastener is repeated, so that the durability is significantly improved. $R2_{avg}$ may be preferably 80 nm or less, and more preferably 60 nm or less, and still more preferably 50 nm or less. $R2_{max}$ may be preferably 150 nm or less, and more preferably 120 nm or less, and still more preferably 100 nm or less. Even if $R2_{avg}$ is appropriate, a part having locally higher retardation may be a starting point of breakage. Therefore, the controlling of $R2_{max}$ in addition to $R2_{avg}$ will be effective for improving the durability.

In the molded surface fastener (100) according to an embodiment of the present invention, a relationship: $R2_{avg}/R1_{avg}=0.04$ to 5.0 is satisfied, in which $R1_{avg}$ (unit: nm) is an average value for retardation at a position (a dotted line B in FIG. 1) which is a half of a height (H) of each engaging element (101) from the main surface of the base portion (102). The satisfying of the relationship means that hardness of the stem (103) and the head portion (104) is well balanced, which is advantageous for balancing the peeling strength and the durability. $R2_{avg}/R1_{avg}$ is preferably from 0.10 to 4.0, and more preferably from 0.20 to 2.0, and still more preferably from 0.50 to 1.0.

$R1_{avg}$ is an index of the hardness of the stem. From the viewpoint of the balance between the peeling strength and the durability, $R1_{avg}$ is preferably from 10.4 to 50 nm, and more preferably from 20 to 40 nm, and still more preferably from 25 to 35 nm.

Figure 3:
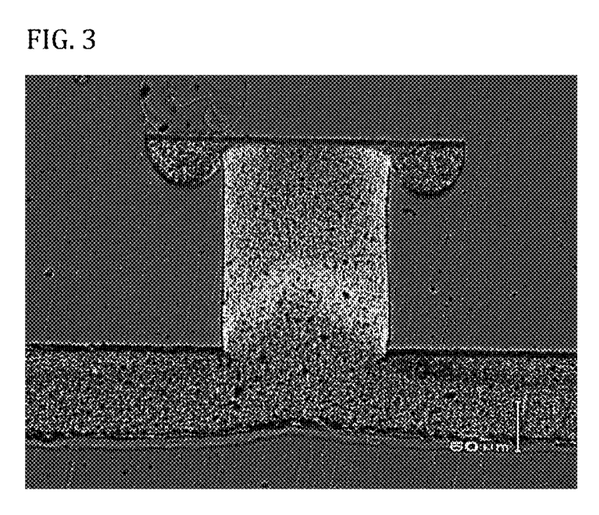
FIG. 3 is a cross-sectional polarized image for an example of an engaging element of a molded surface fastener according to the present invention.
Figure 4:
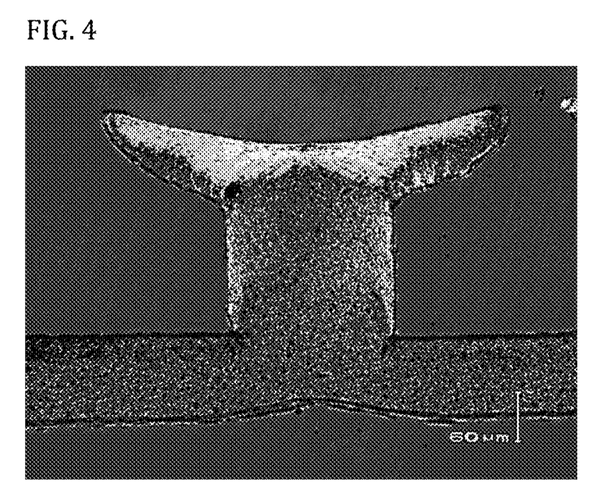
FIG. 4 is a cross-sectional polarized image for an example of an engaging element of a conventional molded surface fastener.

Measurement of the retardation is carried out by preparing a microtome having a thickness of 0.010 mm including the central portion in the molding direction (MD direction) for one engaging element to observe a cross section perpendicular to the molding direction (MD direction) of the molded surface fastener by the resin embedding method, and by using a Senarmont compensator under a standard system of a polarization microscope according to JIS B 7251: 2000. FIG. 3 shows a polarized image of a cross section for an example of the engaging element of the molded surface fastener according to the present invention. Further, FIG. 4 shows a polarized image of a cross section for an example of the engaging element of the conventional molded surface fastener.

(3. Manufacturing Method)

The molded surface fastener according to the present invention can be manufactured by carrying out, for example, the following steps 1) to 4):

1) providing a long strip primary molded article made of a thermoplastic resin, in which one main surface includes a plurality of upstanding stems having residual strain, and the other main surface is flat;

2) while conveying the primary molded article in the longitudinal direction, melting and deforming an upper end portion of each stem to preform an engaging head portion comprising a projection portion extending mainly in a direction perpendicular to the conveying direction as viewed in a planar view, by pressing the primary molded article at a pressure of from 3 to 300 kPa, preferably from 5 to 200 kPa, more preferably from 10 to 100 kPa, for 1 second or less, preferably from 0.00001 to 1 second, more preferably from 0.00001 to 0.5 seconds, even more preferably 0.00001 to 0.1 seconds, with a first press portion, the first press portion having a temperature higher than the melting point of the resin by 0 to 70° C., preferably by 5 to 50° C., more preferably by 10 to 30° C. on the upper end portion side of the stem and a temperature of from 10 to 50° C., preferably from 15 to 40° C., more preferably from 20 to 30° C., on the other main surface side of the primary molded article;

3), after the step 2), while conveying the preformed primary molded article in the longitudinal direction, melting and deforming the engaging head portion to adjust a shape and retardation of the engaging head portion by pressing the preformed primary molded article at a pressure lower than the pressure in the step 2), preferably at a pressure of from 20 to 80%, more preferably from 30 to 70%, even more preferably from 40 to 60%, of the pressure in the step 2), but at a pressure of from 3 to 150 kPa, preferably from 5 to 100 kPa, more preferably from 10 to 50 pKa, for 0.3 to 10 seconds, preferably for 0.4 to 5 seconds, more preferably for 0.5 to 2 seconds, with a second press portion, the second press portion having a temperature higher than the melting point of the resin by 0 to 70° C., preferably by 5 to 50° C., more preferably by 10 to 30° C., on the engaging head portion side of the preformed primary molded article and a temperature of from 10 to 50° C., preferably from 15 to 40° C., more preferably from 20 to 30° C., on the other main surface side of the preformed primary molded article; and 4), after the step 3), while conveying the primary molded article with the adjusted shape and retardation of the engaging head portion in the longitudinal direction, cooling the engaging head portion and the other main surface by bringing each of them into contact with a cooling zone, preferably a cooling zone of from 10 to 100° C., more preferably from 20 to 50° C., to provide a secondary molded article.

Figure 5:
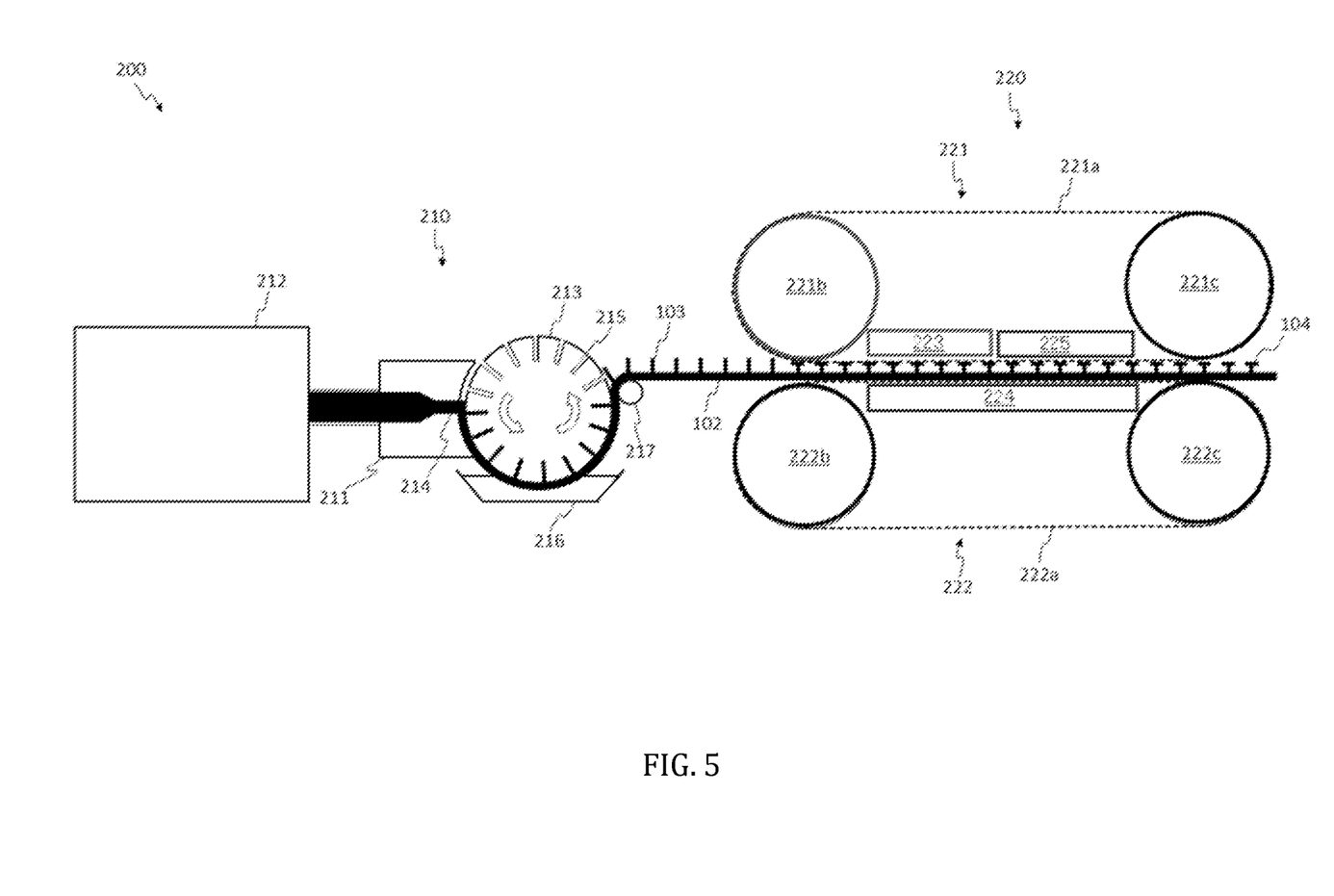
FIG. 5 is a schematic view of an apparatus for continuously manufacturing a molded surface fastener according to the present invention.

The step 1) can be industrially performed by using, for example, a primary molding apparatus (210) of a continuous manufacturing apparatus (200) for the molded surface fastener shown in FIG. 5. Reference numeral (211) in the figure shows an extrusion nozzle of a continuous extruder (212). The curved surface of the tip of the nozzle (211) has an arcuate surface having substantially the same curvature as that of a cylindrical drum (213) as described below. The extrusion nozzle (211) is provided so as to be opposed to the curved surface of the cylindrical drum (213) such that a gap corresponding to the thickness of the base portion (102) to be molded is formed. The extrusion nozzle (211) may be, for example, a T-shaped die, and a molten resin is continuously extruded through a resin extrusion port (214) formed at the center of the tip arcuate surface, with a predetermined resin pressure and a predetermined flow rate.

The cylindrical drum (213) is in the form of a hollow drum having a water cooling jacket (not shown) which is an internal cooling means. The peripheral surface of the cylindrical drum (213) has a function as a part of the molding surface for the molded surface fastener (100). As described above, the gap is provided between the peripheral surface and the tip arcuate surface of the extrusion nozzle (211), and the axis of the cylindrical drum (213) is set to be parallel to the extrusion port (214).

The peripheral surface of the rotary drum (213) is provided with a plurality of cavities (215) for primarily molding the engaging elements. The arrangement, shape and size of the cavities (215) may be varied according to the arrangement, shape and size of the targeted stems, as needed. As the molten resin is continuously extruded through the extrusion nozzle (211) toward the peripheral surface of the cylindrical drum (213) that rotates in one direction, the base portion (102) is molded along the peripheral surface of the drum, and at the same time, the cavities (215) are filled with a part of the molten resin, and a plurality of the stems (103) in the form of, for example columnar, are integrally molded on the back side of the base portion (102), to continuously produce a long strip primary molded article on the peripheral surface of the rotating cylindrical drum (213).

The primary molded article that moves while being supported on the peripheral surface of the cylindrical drum (213) is positively cooled through the water cooling jacket (not shown) incorporated in the cylindrical drum (213) and a cooling water tank (216) in which the lower part of the cylindrical drum (213) is immersed, and then separated from the peripheral surface of the cylindrical drum (213) by a peeling roller (217) which is a take-up means, and transferred to a downstream secondary molding apparatus (220). Strain remains in the stems (103) of the primary molded article thus obtained.

The steps 2) to 4) can be carried out by the secondary molding apparatus (220). The secondary molding apparatus (220) includes an upper endless belt conveyor (221) having both an upper endless belt (221a) running while being contacted with the upper end portions of the stems (103) of the primary molded article; and a pair of guide rollers (221b, 221c) for guiding a running route of the endless belt (221a), the guide rollers being positioned in front and rear in the conveying direction. The secondary molding apparatus (220) also includes a lower endless belt conveyer (222) having both a lower endless belt (222a) running while being contacted with the base portion (102) of the primary molded article; and a pair of guide rollers (222b, 222c) for guiding a running route of the endless belt (222a), the guide rollers being positioned in front and rear in the conveying direction.

The step 2) can be carried out by heating the front guide roller (221b) of the upper endless belt conveyor (221) and pressing the primary molded article downward by the front guide roller (221b) to carry out hot pressing. The upper end portions of the stems (103) are melted and deformed by the heat pressing in the step 2) to preform the engaging head portions (104) each having the projection portion extending mainly in the direction perpendicular to the conveying direction as viewed in a planar view. This allows sufficient heating of the upper endless belt prior to contact with the engaging head portions (104), so that the upper endless belt can be heated to the set temperature when the upper endless belt comes into contact with the engaging head portions (104). Therefore, during the pressing, any strain of the engaging head portion (104) can be decreased, and a variation in retardation can be suppressed. The implementation of the step 2) allows high-speed production. The above-mentioned conditions during the heat pressing in the step 2) are those which reflect this purpose. In this case, it is preferable that the front guide roller (222b) of the lower endless belt conveyor (222) is maintained at a temperature of from 10 to 50° C., and preferably 20 to 40° C., such that the base portion (102) does not undergo thermal deformation.

A heating plate (223) is installed immediately after the front guide roller (221b) of the upper endless belt conveyor (221), and the step 3) can be carried out by heat-pressing the engaging head portions (104) of the primary molded article in contact with the upper endless belt (221a) with the heating plate (223) from the upper endless belt side. The purpose of the step 3) is to reduce the residual strain while melting and deforming the preformed engaging head portions (104) so as to adjust their shapes. A decrease in the residual strain results in a decrease in an amount of retardation. An excessively high heating temperature or an excessively long heating time or an excessively high pressure in the step 3) leads to excessively reduced retardation and hanging-down of the projection portion, so that it will be difficult to obtain a moderate balance between the peeling strength and the durability. In addition, an excessively low heating temperature, an excessively short heating time or an excessively low pressure in the step 3) leads to an insufficient decrease in retardation or lifting-up of the projection portion, so that it will be difficult to obtain a moderate balance between the peeling strength and the durability. Therefore, the step 3) also requires appropriate heat pressing conditions. The above-mentioned conditions of the heat pressing in the step 3) are those which reflect these points. In this case, it is preferable that in the lower endless belt conveyor (222), the base portion (102) of the primary molded article being in contact with the lower endless belt (222a) is pressed from the lower endless belt side by a cooling plate (224), such that the base portion (102) does not undergo thermal deformation. The temperature of the cooling plate (224) may be preferably from 10 to 100° C., and more preferably 20 to 50° C.

After the step 3), the step 4) of cooling the engaging head portions (104) to 100° C. or lower so as not to cause an unintended characteristic change to the primary molded article in which the shape and retardation of the engaging head portions (104) have been adjusted is carried out to obtain a secondary molded article. The step 4) may be carried out by rapid cooling or by allowing to cool at around the room temperature after the step 3), but the rapid cooling is preferable. By the rapid cooling, the belt of the cooling portion can be shortened, and the productivity can be improved. Further, by the rapid cooling, a difference in density between the main surface of the base portion (102) on the engaging head portion (104) side and the other main surface of the base portion (102) can be reduced, resulting in less curling. An exemplary method for the rapid cooling in the step 4 includes installing a cooling plate (225) immediately after the heating plate (223) of the upper endless belt conveyor (221), and pressing the engaging head portions (104), the shape and retardation of which have been adjusted, of the primary molded article in contact with the upper endless belt (221a) by the cooling plate (225) from the upper endless belt side to cool the engaging head portions (104). The temperature of the cooling plate (225) is lower than the melting point of the resin, and is preferably from 10 to 100° C., and more preferably from 20 to 50° C. Further, the temperature of the cooling plate (225) is preferably lower than the melting point of the resin by 100° C. or more, more preferably by 130° C. or more. However, the temperature of the cooling plate (225) is preferably a temperature within a range where condensation does not occur, that is, a temperature higher than the dew point. At this time, in the lower endless belt conveyor (222), it is preferable that the base portion (102) of the secondary molded article in contact with the lower endless belt (222a) be pressed from the lower endless belt side by the cooling plate (224).

(4. Application)

The molded surface fastener according to the present invention can be used for various applications, including, but not limited to, a fastener for various articles such as disposable diapers, simple medical clothing, napkins, various working simple clothing, underwear and the like.

EXAMPLES

Examples of the present invention are described below, which are provided for better understanding of the present invention and its advantages, and are not intended to limit the invention.

(1. Resin)

In Test Examples 1 to 8, the following thermoplastic resin was used:

Polypropylene (a melting point of 165° C.; available under the trade name of NOVATEC™ PP MA1B from Japan Polypropylene Corporation).

In Test Example 9, the following thermoplastic resin was used:

Polypropylene (a melting point of 162° C.; available under the trade name of PRIME POLYPRO J 830 HV from Prime Polymer Co., Ltd.).

(2. Manufacture of Surface Fastener)

Using the continuous manufacturing apparatus (200) shown in FIG. 5 as described above, polypropylene was extruded at a temperature of 250° C. to provide a long strip primary molded article made of polypropylene in which columnar stems each having a diameter of 0.20 mm and a height of 0.30 mm and upstanding on the flat plate surface were arranged with a number density of 280/cm². During this process, the water temperature of the water cooling jacket inside the cylindrical drum (213) was changed according to the test numbers. More particularly, the water temperature was 10° C. for Test Examples 1 to 3, 5, 6, 8 and 9, 60° C. for Test Example 4, and 40° C. for Test Example 7. Then, using the upper endless belt conveyor of the belt conveyor-type secondary molding apparatus (220) as shown in FIG. 5 according to the test numbers under the operating conditions shown in Table 1, the stems of the primary molded articles were deformed to secondarily form the head portions, thereby producing long strip surface fasteners according to Inventive Examples and Comparative Examples. It should be noted that the lower endless belt conveyor was operated at a temperature of 30° C. at the front guide roll, a temperature of 30° C. at the cooling plate, and a temperature of 30° C. at the rear guide roll.

TABLE 1

| Means | Conditions | Test Example 1 | Test Example 2 | Test Example 3 | Test Example 4 | Test Example 5 | Test Example 6 | Test Example 7 | Test Example 8 | Test Example 9 |
|---|---|---|---|---|---|---|---|---|---|---|
| Front Guide Roll (221b) | Temperature (° C.) | 185 | 185 | 167 | 185 | 150 | 185 | 185 | 185 | 185 |
| | Pressure (kPa) | 50 | 50 | 120 | 50 | 300 | 50 | 50 | 50 | 50 |
| | Time (s) | 0.012 | 0.012 | 0.012 | 0.012 | 0.012 | 0.012 | 0.012 | 0.012 | 0.012 |
| Heating Plate (223) | Temperature (° C.) | 185 | 200 | 167 | 185 | 150 | 240 | 185 | 190 | 185 |
| | Pressure (kPa) | 20 | 20 | 80 | 20 | 300 | 20 | 20 | 20 | 20 |
| | Time (s) | 0.6 | 0.6 | 0.6 | 0.6 | 0.6 | 0.6 | 0.6 | 0.6 | 0.6 |
| Cooling Plate (225) | Temperature (° C.) | 30 | 30 | 30 | 30 | 30 | 30 | 30 | 30 | 30 |
| | Pressure (kPa) | 20 | 20 | 20 | 20 | 20 | 20 | 20 | 20 | 20 |
| | Time (s) | 0.6 | 0.6 | 0.6 | 0.6 | 0.6 | 0.6 | 0.6 | 0.6 | 0.6 |
| | Section | Inventive Example | Inventive Example | Inventive Example | Comparative Example | Comparative Example | Comparative Example | Inventive Example | Inventive Example | Inventive Example |

(3. Retardation)

For each of the surface fasteners thus obtained, retardation of the stem and the head portion was measured. The measurement of the retardation was carried out by the method as described above using a system polarizing microscope (model BX 53-P, a Senarmont compensator U-SCE, available from Olympus Corporation). Also, the retardation was measured for ten engaging elements arbitrarily selected for each surface fastener, and an average value for the ten engaging elements was determined to be the measured value. The results are shown in Table 2.

The symbols in the table are as follows:

$R1_{avg}$: an average value for retardation at a position which is a half of the height (H) from the main surface of the base portion of each engaging element;

$R2_{avg}$: an average value for retardation of the head portion on the two lines extending vertically upward from the two boundary points on the right and left between the stem and the projection portion (the right and left refer to the fight and left directions in FIG. 2); and $R2_{max}$: the maximum value for retardation of the head portion on the two lines extending vertically upward from the two boundary points between the stem and the projection portion.

(4. Peeling Strength)

The peeling strength for each surface fastener was measured in accordance with JIS-L-3416-2000. As a loop pile fabric to be engaged with the surface fastener, MAMMY POCO tape available from Unicharm Corporation was used. The peeling direction was the TD direction. The results are shown in Table 2.

(5. Durability)

The retention rate of the peeling strength for each surface fastener was measured in accordance with JIS-L-3416-2000. As a loop pile fabric to be engaged with the surface fastener, MAMMY POCO tape available from Unicharm Corporation was used. The peeling direction was the TD direction. Table 2 shows the peeling strength retention rates after ten repetitions.

(6. Evaluation of Shape)

By observing the engaging head portions of the engaging elements of each surface fastener from an upper side (as viewed in a planar view) (see FIG. 2), the length T of each engaging head portion in the TD direction, the length M of each engaging head portion in the MD direction, and the right and left protruding lengths L of each projection portion from each stem in the TD direction were measured using a microscope. Ten engaging elements for each surface fastener were measured, and an average value thereof was determined to be the measured value.

(7. Discussion)

The results in Table 2 demonstrated that the molded surface fastener according to Inventive Examples had a good balance between the peeling strength and the retention rate of the peeling strength. It was also found that the balance was improved when the parameters $R1_{avg}$, $R2_{avg}$, $R2_{max}$, and $R2_{avg}/R1_{avg}$ representing the retardation are within the preferable range. In particular, Test Example 1 showed the most excellent balance between the peeling strength and the retention rate of the peeling strength.

On the other hand, in Test Example 4, the peeling strength could not be ensured because the ratio $R2_{avg}/R1_{avg}$ was too large. In Test Example 5, the peeling strength was sufficient but the retention rate of the peeling strength was poor as compared with Inventive Examples because $R2_{avg}$ was too large. In Test Example 6, the peeling strength could not be ensured because the ratio $R2_{avg}/R1_{avg}$ was too small.

DESCRIPTION OF REFERENCE NUMERALS 100 molded surface fastener
101 engaging element
102 base portion
103 stem
104 engaging head portion
105 projection portion
200 continuous manufacturing apparatus for molded surface fastener
210 primary molding apparatus
211 extrusion nozzle
212 continuous extruder
213 cylindrical drum
214 extrusion port
215 cavity
216 cooling water tank
217 peeling roller
220 secondary molding apparatus
221 upper endless belt conveyor
221a upper endless belt
221b, 221c, 222b, 222c guide roller
222 lower endless belt conveyor
222a lower endless belt
223 heating plate
224, 225 cooling plate

What is claimed is:

1. A molded surface fastener made of a thermoplastic resin, comprising: a flat plate-shaped base portion; and a plurality of engaging elements protruding from one main surface of the base portion,

TABLE 2

| Test Items | | Unit | Test Example 1 | Test Example 2 | Test Example 3 | Test Example 4 | Test Example 5 | Test Example 6 | Test Example 7 | Test Example 8 | Test Example 9 |
|---|---|---|---|---|---|---|---|---|---|---|---|
| Retardation | $R1_{max}$ | nm | 30.9 | 30.4 | 30.7 | 5.1 | 30.2 | 30.8 | 10.4 | 30.5 | 30.5 |
| | $R2_{avg}$ | nm | 30.8 | 2.5 | 95.3 | 30.7 | 120.5 | 0.3 | 30.9 | 11.8 | 20.6 |
| | $R2_{max}$ | nm | 40 | 4 | 153 | 47 | 237 | 1 | 55 | 18 | 31 |
| | $R2_{avg}/R1_{max}$ | — | 0.997 | 0.082 | 3.104 | 6.020 | 3.990 | 0.010 | 2.971 | 0.387 | 0.675 |
| Peeling Strength | | N/cm | 1.81 | 0.94 | 1.96 | 0.51 | 1.19 | 0.42 | 1.63 | 1.21 | 1.67 |
| Peeling Strength Retention Rate | | % | 95 | 97 | 71 | 83 | 42 | 88 | 81 | 96 | 96 |
| Shape of Head Portion | T | mm | 0.333 | 0.341 | 0.322 | 0.334 | 0.398 | 0.325 | 0.332 | 0.327 | 0.334 |
| | M | mm | 0.310 | 0.316 | 0.314 | 0.325 | 0.373 | 0.324 | 0.324 | 0.319 | 0.312 |
| | L (Left) | mm | 0.063 | 0.067 | 0.058 | 0.064 | 0.091 | 0.059 | 0.063 | 0.060 | 0.064 |
| | L (Right) | mm | 0.063 | 0.067 | 0.058 | 0.064 | 0.091 | 0.059 | 0.063 | 0.060 | 0.064 |
| | Section | | Inventive Example | Inventive Example | Inventive Example | Comparative Example | Comparative Example | Comparative Example | Inventive Example | Inventive Example | Inventive Example | wherein each engaging element comprises: a stem upstanding from the main surface; and an engaging head portion formed at an upper end portion of the stem, the head portion comprising a projection portion extending mainly in a direction perpendicular to a molding direction as viewed in a planar view; and wherein the molded surface fastener satisfies the relationships: $2 \leq R2_{avg} \leq 100$, and $R2_{avg}/R1_{avg} = 0.04$ to $5.0$, in which $R1_{avg}$ (unit: nm) is an average value for retardation at a position which is a half of a height of each engaging element from the main surface of the base portion, and $R2_{avg}$ (unit: nm) is an average value for retardation of each engaging head portion on two lines extending vertically upward from two boundary points on the right and left between the stem and the projection portion, in a cross section taken when each engaging element is cut at a center of the molding direction in the direction perpendicular to the molding direction.

2. The molded surface fastener according to claim 1, wherein the molded surface fastener satisfies the relationship: $5 \leq R2_{max} \leq 200$, in which $R2_{max}$ (unit: nm) is the maximum value for retardation of the engaging head portion on the two lines extending vertically upward from two boundary points between the stem and the projection portion, respectively.

3. The molded surface fastener according to claim 1, wherein the $R1_{avg}$ is from 20 to 40 nm.

4. The molded surface fastener according to claim 1, wherein the $R2_{avg}$ is from 20 to 50 nm.

5. The molded surface fastener according to claim 1, wherein the thermoplastic resin has a melting point of from 150 to 170° C.

6. The molded surface fastener according to claim 1, wherein the thermoplastic resin is polypropylene.

7. A method for manufacturing the molded surface fastener according to claim 1, comprising the steps of:
1) providing a long strip primary molded article made of a thermoplastic resin, the primary molded article comprising a plurality of upstanding stems having residual strain on one main surface;
2) while conveying the primary molded article in a longitudinal direction, melting and deforming an upper end portion of each stem to preform an engaging head portion comprising a projection portion extending mainly in a direction perpendicular to a conveying direction as viewed in a planar view, by pressing the primary molded article at a pressure of from 3 to 300 kPa for 1 second or less with a first press portion, the first press portion having a temperature higher than a melting point of the resin by 0 to 70° C. on an upper end portion side of the stem and a temperature of from 10 to 50° C. on the other main surface side of the primary molded article;
3), after the step 2), while conveying the preformed primary molded article in the longitudinal direction, melting and deforming the engaging head portion to adjust a shape and retardation of the engaging head portion by pressing the preformed primary molded article at a pressure lower than the pressure in the step 2) but from 3 to 150 kPa for 0.3 to 10 seconds with a second press portion, the second press portion having a temperature higher than the melting point of the resin by 0 to 70° C. on an engaging head portion side of the preformed primary molded article and a temperature of from 10 to 50° C. on the other main surface side of the preformed primary molded article; and
4), after the step 3), while conveying the primary molded article with the adjusted shape and retardation of the engaging head portion in the longitudinal direction, cooling the engaging head portion and the other main surface by bringing each of them into contact with a cooling zone to provide a secondary molded article.

8. The method for manufacturing the molded surface fastener according to claim 7, wherein the step 2), the step 3) and the step 4) are carried out while the primary molded article obtained by the step 1) passes between a first endless belt conveyor comprising a first endless belt running in contact with the upper end portions of the stems of the primary molded article and a pair of guide rollers for guiding a running route of the first endless belt, the guide rollers being positioned in front and rear in the conveying direction; and a second endless belt conveyor comprising a second endless belt running in contact with the other main surface of the primary molded article and a pair of guide rollers for guiding a running route of the second endless belt, the guide rollers being positioned in front and rear in the conveying direction.

9. The method for manufacturing the molded surface fastener according to claim 8, wherein the step 2) is carried out by pressing the primary molded article with the pair of guide rollers positioned at a front part.

10. The method for manufacturing the molded surface fastener according to claim 8, wherein the step 3) is carried out by pressing the engaging head portions of the primary molded article in contact with the first endless belt from a first endless belt side with a heating member having a temperature higher than the melting point of the resin by 0 to 70° C., and by pressing the other main surface of the primary molded article in contact with the second endless belt from a second endless belt side with a cooling member having a temperature of from 10 to 50° C.

11. The method for manufacturing the molded surface fastener according to claim 8, wherein the step 4) is carried out by pressing the engaging head portions of the primary molded article in contact with the first endless belt from a first endless belt side with a cooling member having a temperature of from 10 to 100° C. but lower than the melting point of the resin, and by pressing the other main surface of the primary molded article in contact with the second endless belt from a second endless belt side with a cooling member having a temperature of from 10 to 50° C.

12. An article comprising the molded surface fastener according to claim 1.

\* \* \* \* \*

UNITED STATES PATENT AND TRADEMARK OFFICE
CERTIFICATE OF CORRECTION

PATENT NO. : 11,470,922 B2
APPLICATION NO. : 16/081412
DATED : October 18, 2022
INVENTOR(S) : Isamu Michihata et al.

It is certified that error appears in the above-identified patent and that said Letters Patent is hereby corrected as shown below:

In the Specification

In Column 2, Line 58, delete "stain" and insert -- strain --.

In Column 9, Line 15, delete "pKa," and insert -- kPa, --.

Signed and Sealed this
Third Day of January, 2023

Katherine Kelly Vidal
*Director of the United States Patent and Trademark Office*